US005476020A

United States Patent [19]
Garvey et al.

[11] Patent Number: 5,476,020
[45] Date of Patent: Dec. 19, 1995

[54] WORKPIECE AND HANDLEBAR ADJUSTMENT APPARATUS

[76] Inventors: Brian M. Garvey; Benjamin Garvey, both of 1261 Main Street, Canning, Nova Scotia B0P 1HO, Canada

[21] Appl. No.: 235,784

[22] Filed: Apr. 29, 1994

[51] Int. Cl.⁶ .......................... B62K 21/12; B65D 45/30; F16B 13/04
[52] U.S. Cl. .......................... 74/551.1; 280/279; 292/257; 411/80; 403/322
[58] Field of Search ............... 74/551.1–551.8; 280/279; 292/46, 256.65, 257, 305; 411/80, 79, 344, 354; 403/322

[56] References Cited

U.S. PATENT DOCUMENTS

| | | | |
|---|---|---|---|
| 524,477 | 8/1894 | Biddle | 292/257 X |
| 1,281,000 | 10/1918 | Hayter | 411/354 X |
| 1,312,496 | 8/1919 | Anderson et al. | 292/257 |
| 1,721,363 | 7/1929 | Wesp | 411/354 X |
| 2,034,266 | 3/1936 | Moore et al. | 411/354 |
| 3,709,088 | 1/1973 | Pitzer | 411/354 X |
| 3,874,701 | 4/1975 | Soong | 280/278 |
| 4,688,817 | 8/1987 | Marier | 280/278 |
| 4,763,957 | 8/1988 | Poehlmann et al. | 411/354 X |
| 4,911,348 | 3/1990 | Rasor et al. | 292/257 |
| 5,115,736 | 5/1992 | Rodolico et al. | 403/322 X |
| 5,160,165 | 11/1992 | Hoblingre | 411/354 X |

FOREIGN PATENT DOCUMENTS

| | | | |
|---|---|---|---|
| 226749 | 12/1922 | Canada | 74/551.3 |
| 1048112 | 12/1953 | France | 411/354 |
| 2539797 | 7/1984 | France | 292/305 |
| 2228042 | 8/1990 | United Kingdom | 411/354 |

*Primary Examiner*—Vinh T. Luong
*Attorney, Agent, or Firm*—Jones, Tullar & Cooper

[57] ABSTRACT

Apparatus adapted for adjusting the position of articles held together by tensioned fasteners such as bolts having a head, a threaded shaft and a nut into which the shaft is threaded includes first and second washer members that are receivable in a stacked array on the bolt shaft between the bolt head and an adjacent surface of one of the articles. Each of the washer members has a diametrically extending semi-cylindrical groove in the surface thereof which faces the other washer member. A cam lever has opposed cam pins of arcuate non-circular cross-section receivable between the washer members within the grooves. Movement of the cam lever to first or second positions thereof will cam the washer members away from or towards each other respectively, thereby applying tension to or releasing tension from the bolt so as to clamp the articles together or release them for movement relative to each other. The apparatus may be applied, for example, to bicycle handlebars to permit the handlebars to be rotated through 90° for storage purposes.

11 Claims, 4 Drawing Sheets

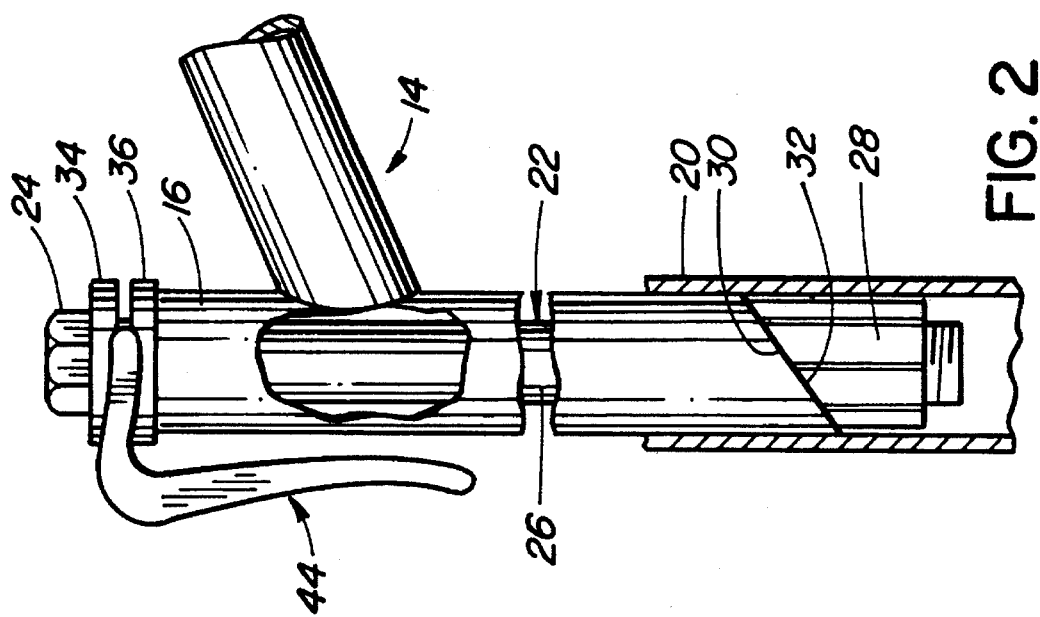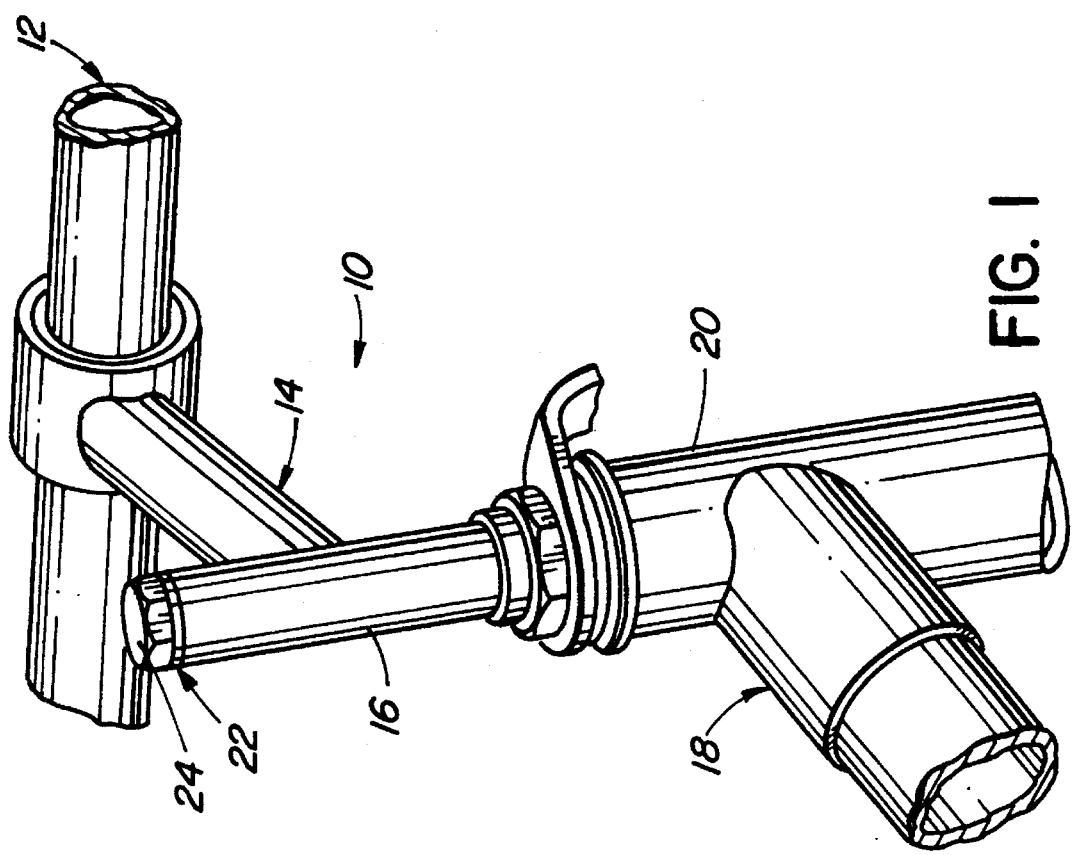

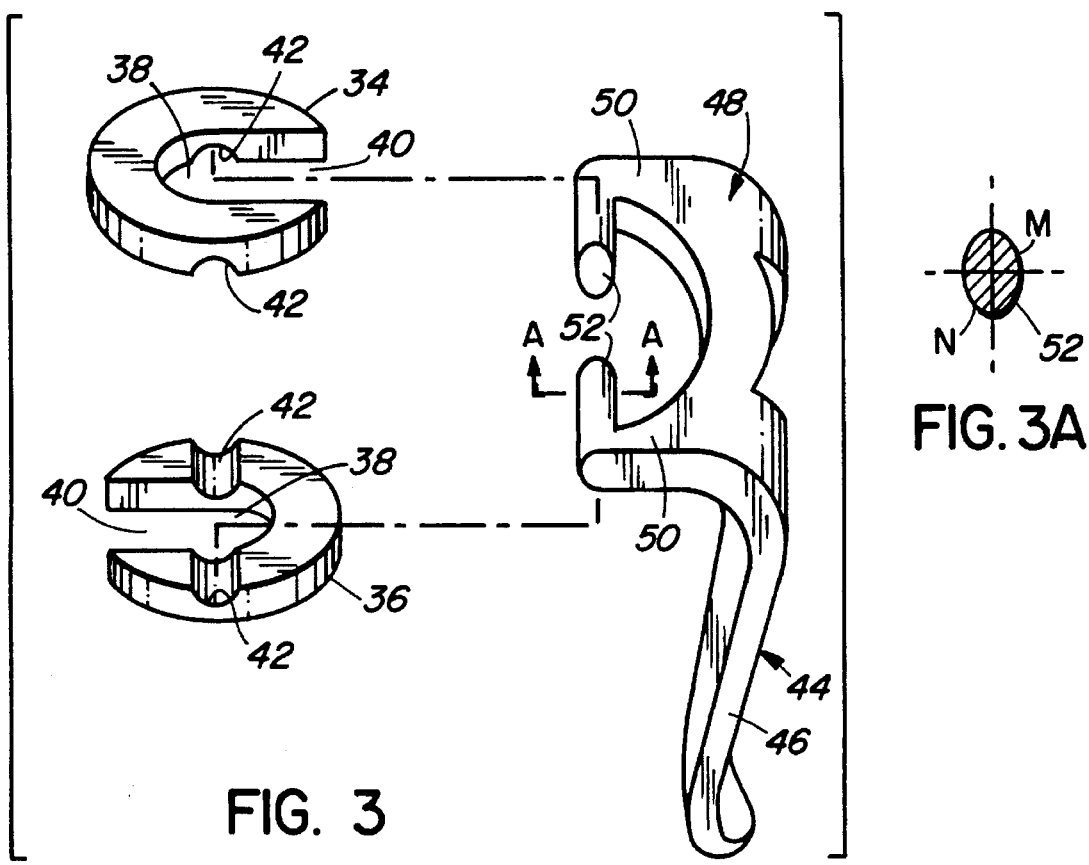
FIG. 3
FIG. 3A
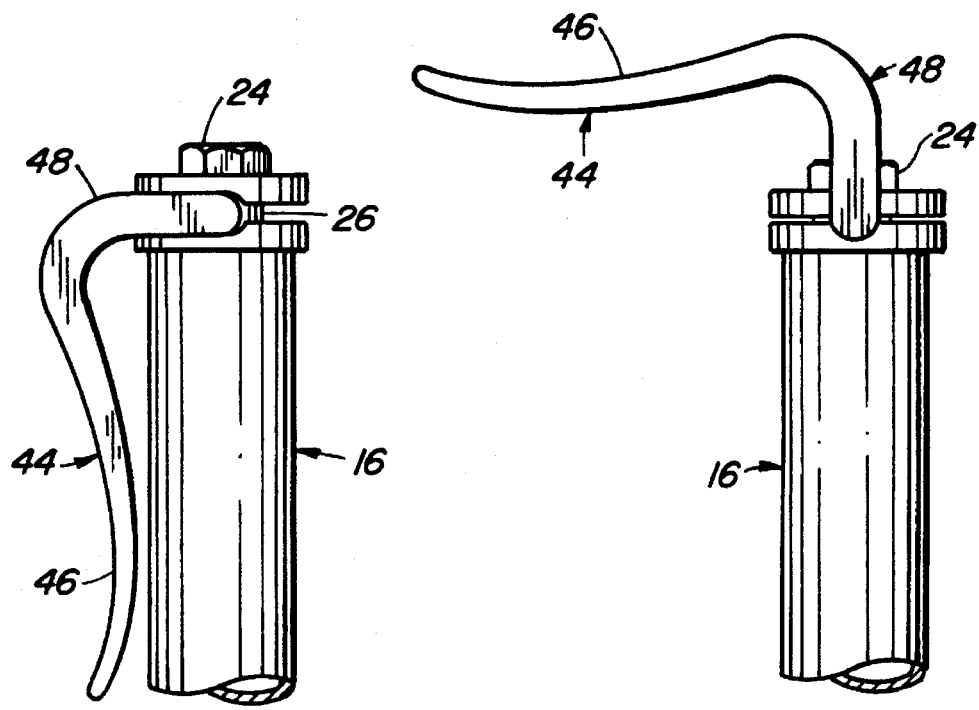
FIG. 4
FIG. 5

WORKPIECE AND HANDLEBAR ADJUSTMENT APPARATUS

FIELD OF THE INVENTION

This invention relates generally to a convenient locking and releasing mechanism which can be applied to many devices wherein adjustment of a sliding, rotating or intruding/protruding nature is required. In particular, the invention relates to apparatus that permits, for example, the quick and easy adjustment of the handlebars of bicycles either vertically or rotationally; the quick and easy adjustment of equipment such as lathe tool rests and tailstocks; and the quick and easy adjustment of telescopic poles.

BACKGROUND OF THE INVENTION

More and more people are using bicycles as a mode of transportation and as a piece of exercise equipment. Present-day bicycles can be very sophisticated, incorporating technological advances and being manufactured of light-weight materials. As a consequence they can be very expensive to purchase. Furthermore, bicycles are owned by a wider cross-section of the populace, including many people who live or work in high rise residential or office buildings. Many of these people prefer to bring their bicycles into their residence or office rather than leave them on the street, chained to a post or other fixture. Bicycles are also frequently stored in garages where they must compete with automotive vehicles for storage space. During winter months, bicycles often are stored in basements where they take up a considerable volume of storage space.

One problem with bicycle storage is the width of the handlebars, which necessitates a storage volume for the bicycle much greater than if the handlebars were not present. It is of course very inconvenient to remove the handlebars each time a bicycle is stored and to replace them the next time the bicycle is to be used. It is even more inconvenient to remove the handlebars when the storage time is short, as it will be when the bicycle is in constant use. One must use a wrench or similar tool to loosen the stem bolt so as to allow removal of the handlebars and then use the tool to tighten the stem bolt when the handlebars are to be reattached to the bicycle.

There are also instances in which articles or workpieces are connected together by headed fasteners, such as bolts, and in which there can be occasional requirements to loosen the fasteners sufficiently to allow adjustment or repositioning of the articles relative to each other. Examples of such a situation would include telescopic poles used by painters, extendable poles used in the cleaning of swimming pools, music stands or tripods or similar supports that must be adjusted so that the support platform thereof is level. The legs of the support might be connected together by bolts, the loosening and retightening of which for adjustment purposes is time consuming and frustrating for the operator.

Another common instance of workpieces or elements requiring sliding adjustment relative to each other is the tailstock of a lathe or the tool rest thereof. Typically it is necessary to loosen a bolt each time movement is required to reposition the tailstock or the tool rest and this becomes an irritating procedure. Often the wrench or spanner used to loosen or tighten the bolts is misplaced and extra time must be spent searching therefor before the desired adjustment can be accomplished.

SUMMARY OF THE INVENTION

The present invention overcomes the problems enumerated above by providing a kit of parts that can be easily installed generally wherever a bolt is normally used to tighten components against each other by increasing the friction between them. The parts of the kit may be installed without removing the bolt simply by loosening the bolt approximately one half inch, installing the parts and then retightening the bolt.

The apparatus of this invention includes first and second washer members receivable in a stacked array on the shaft portion of the bolt between the bolt head portion and an adjacent upper surface of a part to be tightened. Each of the washer members has a diametrically extending semi-cylindrical groove in the surface thereof which faces the other washer member. A cam lever having opposed cam pins of arcuate non-circular cross-section is receivable between the washer members within the grooves. Movement of the cam lever to first or second positions thereof will cam the washer members away from or towards each other respectively, thereby raising or lowering the bolt head portion so as to lock or release the parts normally held tightly together by the bolt.

Preferably the washer members will each have a radially directed slot slightly wider than the diameter of the bolt shaft and extending at right angles to the groove from the outer edge to the inner opening. Although both washer members are identical in construction the lower one will be applied to the bolt shaft portion with the groove thereof facing upwards while the upper one will be applied with its groove facing downwards. Also the slotted washer members will be applied to the shaft portion from opposite directions so that with the cam lever in place it becomes very difficult for the parts to inadvertently become disassembled, even with the cam lever in its relaxed condition. The pins of the cam lever are preferably of a generally elliptical cross-section so that the washer members are separated by the major axis thereof when the bolt is in its locked condition and are separated by the minor axis thereof when the bolt is in its relaxed condition.

The present invention may be used to facilitate the adjustment of bicycle handlebars by allowing the user to quickly and effectively release the handlebars from their locked condition so that they can be rotated to a position parallel to the frame, thereby reducing the lateral space required for storage. The handlebars can just as easily be returned to their operative condition so that the bicycle or other vehicle can be used in its intended fashion. The invention also can be used to adjust the height of the handlebars without rotation.

A typical handlebar set will include the handlebars themselves and a sleeve portion which will be connected to the bicycle frame by way of a stem bolt passing through the sleeve portion and being received in a tubular portion of the frame. The stem bolt includes a head portion, a shaft portion, and a wedge portion receivable within the tubular portion for locking the handlebars relative to the frame. The previously mentioned washer members and cam lever can be installed easily on the shaft portion of the stem bolt between the bolt head and the upper edge of the sleeve portion. Movement of the cam lever between first and second positions thereof will cam the washer members away from or towards each other, thereby raising or lowering the stem bolt so as to move the locking wedge into a locked or a relaxed condition, the handlebars being movable relative to the frame when the locking wedge is in its relaxed condition.

BRIEF DESCRIPTION OF THE DRAWINGS

FIG. 1 is a partial perspective view of a typical handlebar assembly.

FIG. 2 is a side view of a handlebar assembly incorporating the components of the present invention.

FIG. 3 is an exploded perspective view of the major components of the present invention.

FIG. 3A is a cross-sectional view of a cam pin taken on the line A—A Of FIG. 3.

FIG. 4 shows a side view of one of the operative positions for the cam lever of this invention.

FIG. 5 shows a side view of the other of the operative positions for the cam lever of this invention.

DESCRIPTION OF THE PREFERRED EMBODIMENTS

Figure 6:
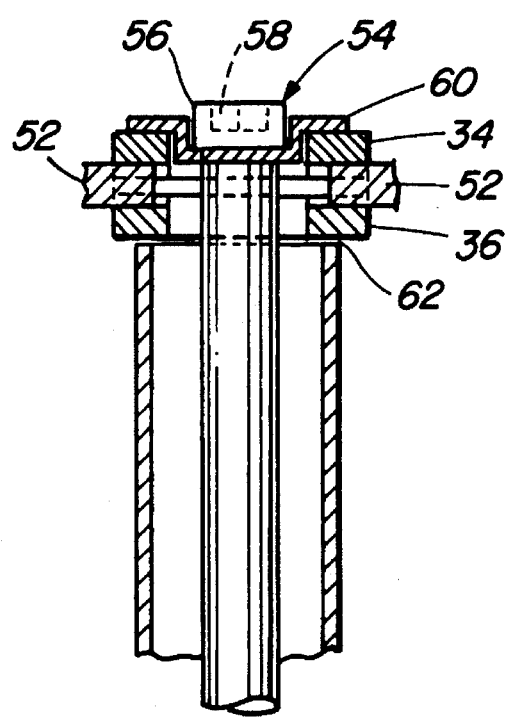
FIG. 6 shows a first alternative configuration, in vertical cross-section, intended to accommodate a different handlebar assembly.

The present invention will initially be described in some detail with respect to the installation thereof in a bicycle handlebar assembly, although it is not to be limited to that application. Examples of other non-limiting applications for the present invention will be provided hereinbelow.

FIG. 1 shows a typical bicycle handlebar assembly 10, including the handlebars 12 themselves connected to a handlebar stem 14 with a sleeve portion 16 thereof at the centre. The frame 18 of a bicycle includes a tubular fork stem portion 20 of a diameter that can receive the lower part of the sleeve portion 16. An expander or stem bolt 22 passes through the sleeve portion 16 to connect the handlebar stem 14 to the bicycle frame 18. As seen in FIG. 2 the stem bolt 22 typically has a head portion 24, a shaft or stem portion 26, and a locking wedge portion or nut 28 at the bottom end thereof. The lower end of the sleeve portion 16 has a sharply sloping edge 30 and the wedge nut has a corresponding sloping edge 32. When the stem bolt is tightened the wedge nut edge 32 contacts the sleeve edge 30 and is wedged against the inside wall of the tubular portion 20 to lock the handlebars in position.

FIGS. 2 and 3 illustrate the main components of the present invention. A pair of annular washer members 34 and 36 is provided, each washer member having a central opening 38 that is just slightly greater in diameter than the diameter of the stem bolt shaft portion 26. Preferably each washer member also has a radial slot 40 that extends from the outer edge of the washer member to the central opening, the slot having the same width as the opening 38. Each of the washer members is provided in one flat surface thereof with a generally semi-cylindrical groove 42 extending diametrically of the washer member and at right angles to the slot 40 if provided. The outer diameter of each washer member should be equal to or just slightly greater than the maximum width of the stem bolt head portion 24.

A cam lever 44 is also provided, the lever having an aesthetically curved, generally L-shaped, handle portion 46 which terminates at its wider end in a generally C-shaped head portion 48. The head portion 48 includes a pair of spaced apart arms 50, each of which has a short arcuate non-circular cam pin 52 extending inwardly of the head on line with and towards the opposing cam pin 52. Each cam pin 52 is preferably elliptical in cross-section as seen in FIG. 3A although other arcuate shapes would suffice. Each cam pin 52 has a major axis M and a minor axis N, with the major axis being longer than the minor axis.

In order to assemble the components of the present invention to a bicycle one first of all loosens the stem bolt 22 by turning the head portion 24 with a suitable wrench. When the stem bolt is loose, so that the bolt can be withdrawn somewhat from the sleeve portion 16, the washer members 34 and 36 are assembled to the stem bolt in a stacked array and in the same orientation as shown in FIG. 3. Each washer member is slid laterally so that the stem bolt shaft portion 26 is passed by the radial slot 40 until the washer member comes to its rest position with the central opening 38 embracing the shaft portion 26. The upper washer member 34 is assembled at 180° to the washer member 36 and is inverted relative thereto so that the groove 42 thereof will overly the groove 42 of the lower washer member 36. The washer members are then pulled apart vertically so that the pins 52 of the cam lever 44 can be positioned therebetween, the pins 52 then being located within the opposed grooves 42 of the two spaced apart washer members 34 and 36. The stem bolt is then tightened, with the cam lever positioned so that the washer members are separated by the minor axis of the pins 52, until one can rotate the handlebars with just a small amount of frictional resistance to such rotation.

If the washer members are not provided with the radial slots 40 then it will be necessary to completely disassemble the stem bolt assembly so that the washer members can be slid onto the shaft portion and positioned adjacent the head portion before the components are reassembled to the bicycle frame. By using two grooved washer members, rather than one grooved and one ungrooved washer member the possibility of the cam pins becoming inadvertently disengaged from the washer members is greatly lessened.

Operation of the present invention is very simple once the components have been assembled to the bicycle. The cam lever 44 is movable between two operating positions shown in FIGS. 4 and 5. In the first position the handlebars are locked against rotation relative to the bicycle frame whereas in the second position it is possible to rotate (or raise or lower) the handlebars relative to the frame. In the first position (FIG. 4) of the cam lever 44 the washer members 34 and 36 are separated by a distance corresponding to the major axis of the non-circular pins 52, which forces the stem bolt head portion 24 outwardly relative to the sleeve portion 16 and causes the wedge nut 28 to lock the sleeve portion 16 in the tubular portion 20 so as to prevent movement of the handlebars. In the second position (FIG. 5) of the cam lever, effected through upwards rotation thereof, the washer members 34 and 36 are allowed to move slightly towards each other, to be separated only by a distance corresponding to the minor axis of the pins 52. This has the effect of lowering the stem bolt 22 and releasing the locking grip of the wedge nut 28 on the tubular portion 20 and thereby allowing the handlebars to be rotated, or changed in elevation, relative to the frame. Once the handlebars have been rotated through about 90° it is easier to store the bicycle in a confined space.

Figure 7:
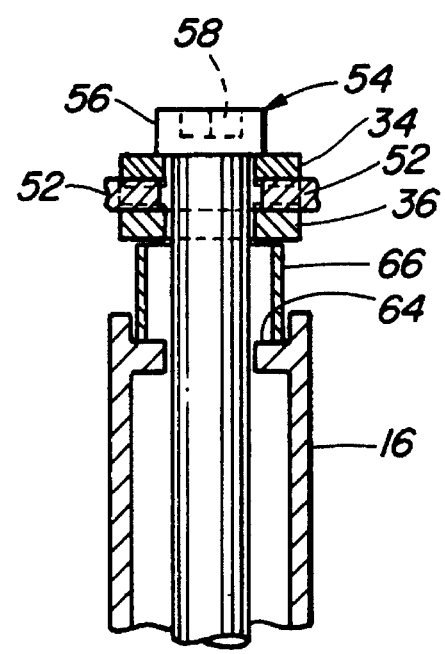
FIG. 7 shows a second alternative configuration, in vertical cross-section, intended to accommodate a different handlebar assembly.
Figure 8:
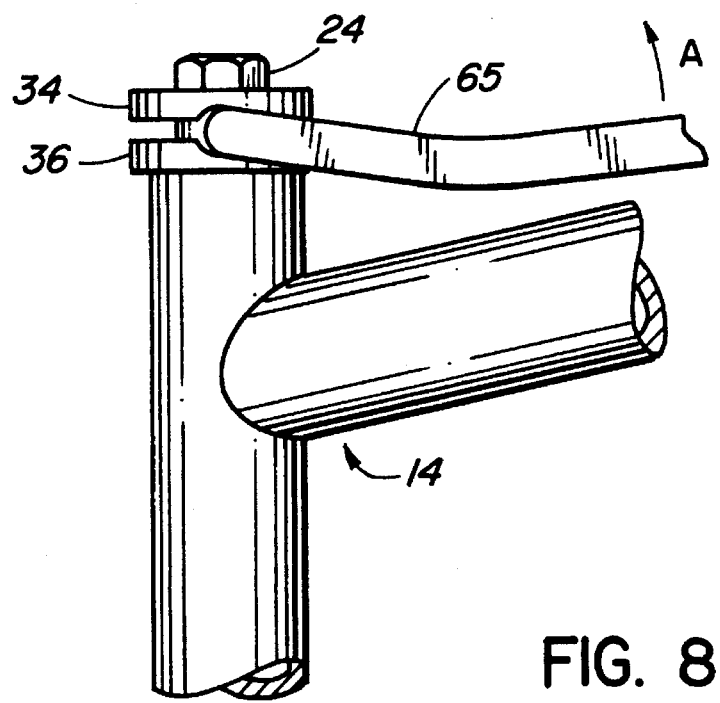
FIG. 8 shows a third alternative configuration intended to accommodate a different handlebar assembly.

Other configurations for the components of the invention may be provided so as to accommodate different styles of bicycles, different vehicles, or different assemblies thereof. For example, as seen in the sectional view of FIG. 6, some stem bolts do not use an enlarged head portion as shown hereinabove. These stem bolts 54 use a smaller diameter head 56 with a hex-shaped recess 58 therein, adapted to receive a hex wrench. This type of assembly may use a recessed or stepped washer 60 between the head 56 and the upper edge 62 of the sleeve portion. For this configuration the washer members 34 and 36 would be positioned below the stepped washer 60 which would in turn act as the head of the stem bolt. In FIG. 7 the head 56 would normally be received in a recessed portion 64 of the sleeve member 16. However, in order to utilize the present invention a short cylindrical collar 66 is positioned in the recess 64 and the washer members 34 and 36 are located between the upper edge of the collar 66 and the head 56, with the cam lever then being positioned, and used as with the first embodiment. If desired the collar 66 could be split in two sections so as to facilitate assembly thereof to the stem bolt. In FIG. 8 the cam lever 65 is straighter than the cam lever 44 and is adapted to lie along an upper angled portion of the handlebar stem 14 rather than to be positioned in front as seen in FIG. 2. The pins thereof would still be non-circular in cross-section, the first position of the cam lever being as shown and the second position thereof being raised as in the direction of the arrow A. In all of these assemblies the operation of the invention is as described for the first embodiment. Other configurations could be accommodated with appropriate adapters for use with the main components of the invention, without departing from the spirit of the invention.

Figure 9:
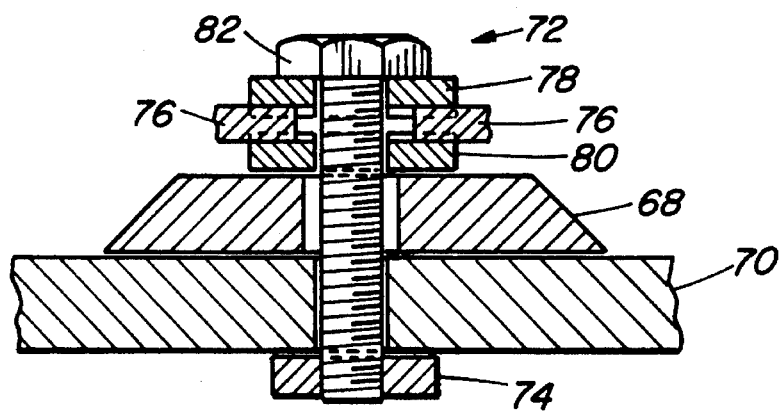
FIG. 9 shows in vertical cross-section, a general application of the present invention in the assembly of a lathe tool rest.

FIG. 9 shows a more generic application of the present invention, wherein an article such as a tool rest 68 is held against a workpiece such as a lathe bed 70 by a tension member such as bolt 72 connected to nut 74. Normally, to adjust the tool rest 68 relative to the lathe bed 70 it is necessary to loosen the bolt 72, effect the positional adjustment, and then retighten the bolt 72. With the present invention, however, one need only move the cam lever, and its pins 76 from, its first position to its second position so as to release the tension in the bolt 72 through the interaction of the pins 76 with the washer members 78, 80 positioned between the bolt head 82 and the adjacent surface of the tool rest 68. Once adjustment has been effected the cam lever is moved back to its first position so as to retension the bolt 72 and thereby lock or clamp the articles in their newly adjusted relationship.

Figure 10:
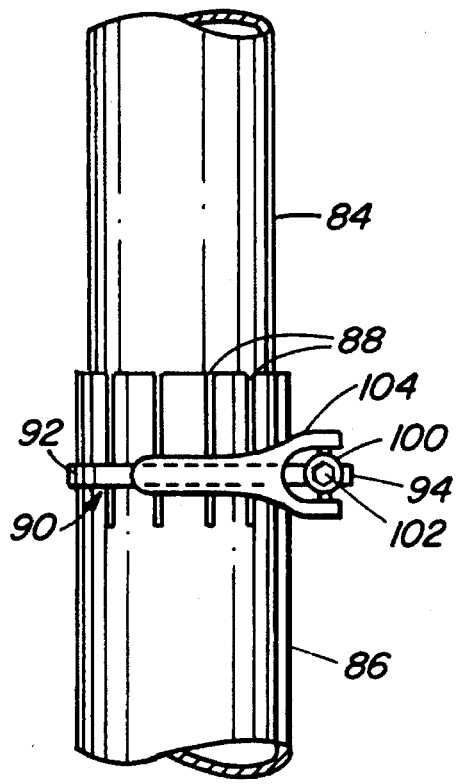
FIG. 10 shows a general application of the present invention in the assembly of a telescopic pole.
Figure 11:
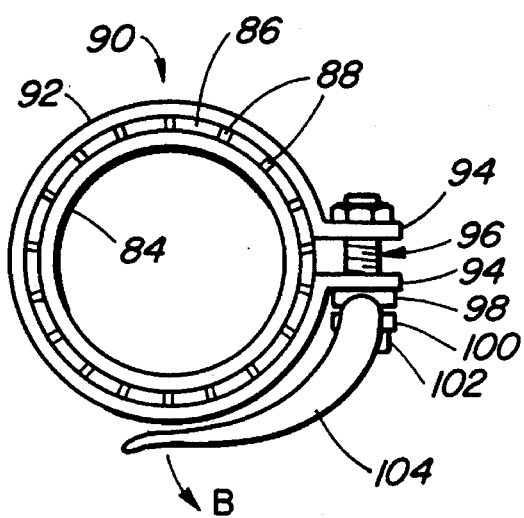
FIG. 11 is an end view of the arrangement of FIG. 10.

In FIGS. 10 and 11 there is shown a telescoping pole arrangement wherein an inner pole member 84 is slidably received within a tubular outer pole member 86. The outer pole member includes a plurality of longitudinally extending slots 88 at the end that receives the inner pole member to permit some inwards movement via an annular clamp member 90. The clamp member 90 includes a band portion 92 that surrounds the slotted area of the pole member 86 and it also includes an apertured radially extending tab member 94 at each end of the band portion to receive a clamping bolt 96. One of the apertures may be threaded to receive the bolt 96 or, if not, the bolt will receive a nut at the end thereof. A pair of grooved washer members 98, 100 as described hereinabove are received on the shaft portion of the bolt 96 between the head 102 thereof and the adjacent tab 94, with the pins of a cam lever 104 being received within the grooves of the washer members. As with the previously described embodiments, movement of the cam lever from its first to its second position (arrow B) will release the tension in the bolt 96, thereby relaxing the tension in the band portion 92 so that the inner pole member 84 can be telescoped within the outer pole member 86. When the desired adjustment has been accomplished the cam lever 104 is moved back to its first position, as shown in FIG. 11 to retension the bolt 96 and thus retension the band portion 92 so as to clamp the slotted area of the outer pole member against the inner pole member and fix the pole members in their new relative positions.

There are any number of further applications for the present invention beyond those described herein, although the principal application is for handlebar adjustment. Skilled workmen would have no difficulty in adapting the invention to their specific needs, without departing from the spirit of the invention. Accordingly the protection to be afforded this invention is to be determined from the claims appended hereto.

We claim:

1. Apparatus adapted for use in fastening articles together by way of a tension fastener having a head portion and a threaded shaft portion, said apparatus comprising: first and second washer members adapted to be received in a stacked array on the shaft portion between the fastener head portion and an adjacent surface of one of the articles, each of the washer members having a diametrically extending semi-cylindrical groove in the surface thereof which faces the other washer member; and a cam lever having opposed arcuate, non-circular cam pins adapted to be received between the washer members within said grooves; whereby with said washer members assembled to said fastener shaft portion and said cam pins positioned between said washer members and within said grooves movement of said cam lever to first or second positions thereof will cam said washer members away from or towards each other respectively, thereby raising or lowering said fastener head portion relative to the adjacent article so as to apply tension to or release tension from said fastener, said articles being movable relative to each other when the tension in said fastener is released.

2. The apparatus of claim 1 wherein each of said washer members is annular and has a radially extending slot therein of a width as least as great as the diameter of said fastener shaft portion.

3. The apparatus of claim 2 wherein said cam lever includes a handle portion and a generally C-shaped head portion having a pair of spaced apart generally parallel arms, said cam pins extending inwardly towards each other from said arms.

4. The apparatus of claim 3 wherein each of said cam pins has an elliptical cross-section, with a major axis and a minor axis, said washer members being separated by the length of the major axis of said cam pins when said cam lever is in said first position and being separated by the length of the minor axis of said cam pins when said cam lever is in said second position.

5. Apparatus adapted for use in adjusting the position of handlebars, a sleeve portion thereof being connected to a frame by way of a stem bolt passing through the sleeve portion and being received in a tubular portion of the frame, the stem bolt including a head portion, a shaft portion and a wedge portion receivable within the tubular portion for locking the handlebars relative to the frame, said apparatus comprising: first and second washer members adapted to be received in a stacked array on the shaft portion between the stem bolt head portion and an adjacent upper edge of the sleeve portion, each of the washer members having a diametrically extending semi-cylindrical groove in the surface thereof which faces the other washer member; and a cam lever having opposed arcuate non-circular cam pins adapted to be received receivable between the washer members within said grooves; whereby with said washer members assembled to said shaft portion and said cam pins positioned between said washer members and within said grooves movement of said cam lever to first or second positions thereof will cam said washer members away from or towards each other respectively, thereby raising or lowering said stem bolt so as to move said locking wedge into a locked or a relaxed condition, said handlebars being movable relative to said frame when said locking wedge is in its relaxed condition.

6. The apparatus of claim 5 wherein each of said washer members is annular and has a radially extending slot therein of a width as least as great as the diameter of said stem bolt shaft portion.

7. The apparatus of claim 6 wherein said cam lever includes a handle portion adapted to lie adjacent said sleeve portion when said cam lever is in said first position thereof, and a generally C-shaped head portion having a pair of spaced apart generally parallel arms, said cam pins extending inwardly towards each other from said arms.

8. The apparatus of claim 7 wherein each of said cam pins has an elliptical cross-section, with a major axis and a minor axis, said washer members being separated by the length of the major axis of said cam pins when said cam lever is in said first position and being separated by the length of the minor axis of said cam pins when said cam lever is in said second position.

9. The apparatus of claim 8, adapted for use in a handlebar assembly wherein the head portion of said stem bolt has a diameter less than the inside diameter of said sleeve portion and would normally be received in a recess within said sleeve portion, said apparatus including a cylindrical collar member adapted to be received within said recess to surround said shaft portion and to support said washer members between the upper edge of the cylindrical member and said head portion.

10. The apparatus of claim 9 wherein said cylindrical member is split longitudinally into two sections to facilitate assembly thereof to said shaft portion.

11. The apparatus of claim 8, adapted for use in a handlebar assembly wherein the head portion of said stem bolt has a diameter less than the inside diameter of said sleeve portion and would normally be received in a recessed washer resting against said sleeve portion, said washer members being adapted to be received on said shaft portion between the upper edge of the sleeve portion and said recessed washer.

* * * * *